United States Patent [19]

Oketani et al.

[11] Patent Number: 5,064,044
[45] Date of Patent: Nov. 12, 1991

[54] INDEXING APPARATUS

[75] Inventors: Tetsuya Oketani; Toshio Ito; Yoshiaki Mase, all of Gifu, Japan

[73] Assignee: Howa Machinery, Ltd., Aichi, Japan

[21] Appl. No.: 676,805

[22] Filed: Mar. 28, 1991

[30] Foreign Application Priority Data

Apr. 2, 1990 [JP] Japan .................................. 1-88979

[51] Int. Cl.⁵ .............................................. F16D 71/00
[52] U.S. Cl. ..................................... 192/141; 192/143; 192/149
[58] Field of Search ......................... 192/141, 143, 149

[56] References Cited

U.S. PATENT DOCUMENTS 2,854,113  9/1958  Hallden ........................... 192/143 X
4,552,403  11/1985  Yindra ............................ 192/143 X
4,666,026  5/1987  Poulin ............................ 192/143 X

FOREIGN PATENT DOCUMENTS 59-201749  11/1984  Japan .

Primary Examiner—Allan D. Herrmann
Assistant Examiner—Nicholas Whitelaw
Attorney, Agent, or Firm—Ladas & Parry

[57] ABSTRACT

An indexing apparatus for a rotary table has a support shaft rotatably supported by a base member in which indexed terminal positions of the rotary table is determined by abutment of a stopper member provided on the rotary table against positioning members provided on the base member. The indexing apparatus comprises a rack-pinion mechanism comprising a rack and a pinion fixed around the support shaft of the rotary table for rotating the same, a feed screw shaft rotatably supported by the base member and extending along the rack in a direction of the movement thereof, a breakable electric motor for driving the feed screw shaft, and a feed nut engaging the feed screw shaft. The rack and the feed nut are arranged so that either one of them has integral portions disposed at both sides of the other with spaces left on both the sides in the direction of the movement of the rack. Annular springs are disposed in each space. As the rotary indexing operation approaches the terminal position, the spring is elastically deformed in the direction of the movement of the rack so that shocks due to the abutting are prevented. Immediately before the indexed terminal positions, the speed of the motor is reduced and then the motor is braked.

11 Claims, 5 Drawing Sheets

INDEXING APPARATUS

BACKGROUND OF THE INVENTION

This invention relates to an indexing apparatus for turning and positioning a rotary table on which a workpiece or jig is to be mounted, and more particularly to an indexing apparatus provided with a mechanism capable of substantially reducing a shock imparted to the rotary table at the time the turning motion of the rotary table is stopped.

There is known a rotary indexing apparatus, operated by fluid-pressure, in which a rotary table is supported on a base to be rotatable and a pinion is attached thereto coaxially thereto. In such an indexing apparatus, a rack meshed with the pinion is formed on the piston rod of a hydraulic or pneumatic cylinder-piston assembly thereby to turn the rotary table by the reciprocating motion caused by the actuation of the cylinder-piston assembly. At each terminal end of the rotary indexing, a stopper member secured to the rotary table is abutted against a positioning member on the base, and the rotary table is then fixed at a terminal position by a clamping device provided independently from the table.

Such fluid-pressure actuated indexing apparatus is not suitable for machine tools that are not provided with a fluid-pressure operating mechanism, such as machine tools in which tool changing operation and controlling operation for spindle rotation and spindle positioning are carried out by an electric driving device such as an electric motor, because each machine tool in a flexible working line would have to be installed with hydraulic units for performing the indexing operation described above. Furthermore in case of utilizing a pneumatic operation mechanism, a great amount of pressurized air is required for ensuring the operation of a number of indexing apparatus, and when shortage of the air supply occurs, the required indexing operation cannot be carried out.

A rotary indexing apparatus, utilizing an electric motor as a drive source, is disclosed, for example, in Japanese Patent Laid-open (KOKAI) Publication No. 59-201749, in which a feed screw is rotated by the operation of an electric motor thereby to axially shift a nut, and a rotary table is turned by the rotation of a rotating arm through a link mechanism in accordance with the movement of the nut. In this apparatus, a drive pin provided at the distal end of the rotating arm is engageable with, and disengageable from a pin hole formed in the rotary table, and an indexing pin (positioning pin) is provided to be engageable with, and disengageable from a table hole by means of a solenoid device provided in addition to the electric motor. Thus, the mechanism for carrying out the indexing operation is complicated.

SUMMARY OF THE INVENTION

An object of this invention is to eliminate the defects or drawbacks encountered in the prior art described above and to provide an indexing apparatus for turning and positioning a rotary table by means of only one electric motor provided with braking means, capable of substantially reducing shocks caused at the time of stopping the turning of the rotary table at the indexed terminal positions.

This and other objects are achieved according to this invention by providing an indexing apparatus for a rotary table having a support shaft rotatably supported by a base, in which terminal positions of the rotary indexing of the rotary table is determined by abutment of a stopper member provided on the rotary table against respective positioning means provided on the base, the indexing apparatus comprising a rack-pinion mechanism including a rack and a pinion mounted around the support shaft of the rotary table for rotating the rotary table by shifting movement of the rack, a feed screw shaft supported in the base to be rotatable, the feed screw shaft extending in parallel with the rack in the direction of the shifting movement thereof, an electric motor equipped with braking means and a drive shaft operatively connected to the feed screw shaft so as to drive the same, a feed nut mounted on the feed screw shaft in screw engaged manner, the rack and the feed nut being arranged so that either one of the rack and the feed nut has integral means disposed at both sides of the other with spaces left on both sides in a direction parallel to the direction of the shifting movement of the rack, and spring means disposed within the respective spaces, the springs being elastically deformable in the direction parallel to the direction of the shifting movement of the rack upon relative movement of the feed nut and the rack.

In a preferred embodiment, the indexing apparatus further comprises a slider supported in the base to be movable in the direction of the movement of the rack, the rack being fixedly mounted to the slider, the slider being provided with an inner slide hole into which the feed nut is disposed to be slidable in the direction of the movement of the rack. The slider is provided with a pair of stopper members on both sides of the feed nut with spaces left in the direction of the movement of the rack, and the springs are disposed between the feed nut and the stopper members, respectively.

In another preferred embodiment, the indexing apparatus further comprises a slider mounted to the base to be movable in the direction of the movement of the rack, the rack being slidably mounted to the slider, the slider being provided with stopper members at both axial end portions thereof, The rack is provided with an operating portion so as to extend therefrom into a space defined between both the stopper members, and the springs are disposed between the stopper members and the operating portion of the rack, respectively.

According to the features of the indexing apparatus described above, the axial movement of the feed nut caused by the operation of the brakable electric motor is transmitted to the rack through the springs and the rotary table is turned through the rack-pinion mechanism in accordance with the shifting movement of the rack. When the rotary table is turned, the stopper member secured to the rotary table abuts against one of the positioning means provided on the base, thereby stopping the rotary table. Shocks caused by the abutment of the stopper member against the positioning means are substantially absorbed by the springs After the rotary table stops, the electric motor is still operated to further move the feed nut thereby to compress the springs, and the electric motor thereafter stops with braking operation. Accordingly, the rotary table is positioned with the stopper member being urged against the positioning means by one of the spring and the thus attained position of the rotary table is stably maintained.

Accordingly, as described above, the shifting movement of the rack is performed by the rotation of the feed screw shaft connected to the brakable electric motor, so that this structure is suitable in use for machine tools that are not equipped with a fluid-pressure operating mechanism and hence, the installation of a fluid-pressure unit is not needed. In addition, since the axial movement of the feed nut screw-engaged with the feed screw shaft is transmitted to the slider with the rack through one of the springs, the shocks caused upon the abutment of the stopper member of the rotary table against the positioning means of the base are minimized in the indexing operation. Moreover, after the abutment, the feed nut further advances until one of the springs is compressed by a predetermined amount, so that a constant pressing force against the positioning means is applied by the stopper member. Due to this pressing force, reverse rotation of the feed screw shaft is prevented by the braking operation on the electric motor, whereby the indexed position of the rotary table is maintained without resorting to any clamping device.

BRIEF DESCRIPTION OF THE DRAWINGS

For a better understanding of this invention and to show how the same is carried out, reference is made, by way of preferred embodiments, to the accompanying drawings, in which.

DESCRIPTION OF THE PREFERRED EMBODIMENTS

A first embodiment of an indexing apparatus according to this invention will be described hereunder with reference to FIGS. 1 to 4.

Figure 1:
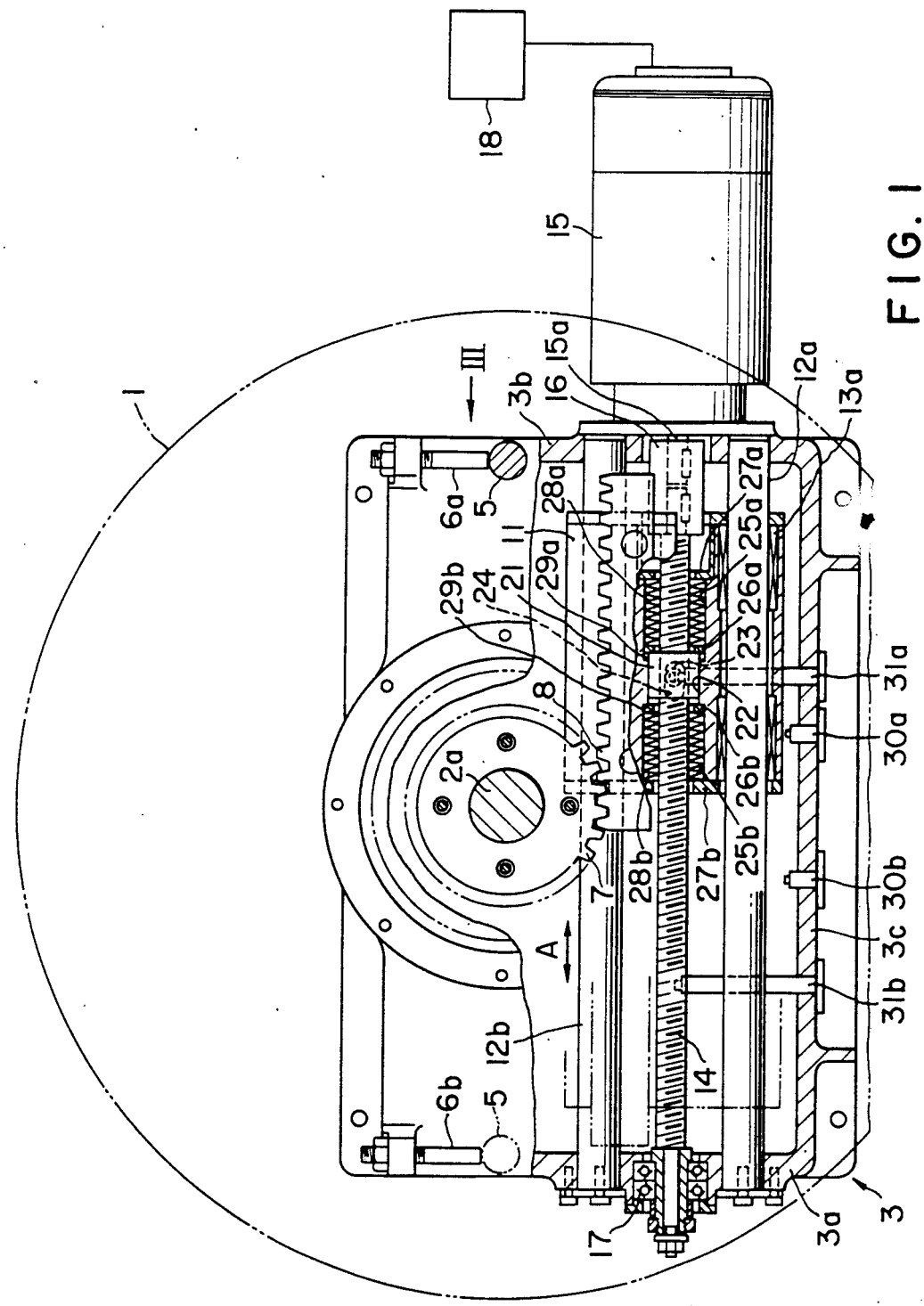
FIG. 1 is a plan view of a first embodiment of the indexing apparatus, partially in section, according to this invention.
Figure 2:
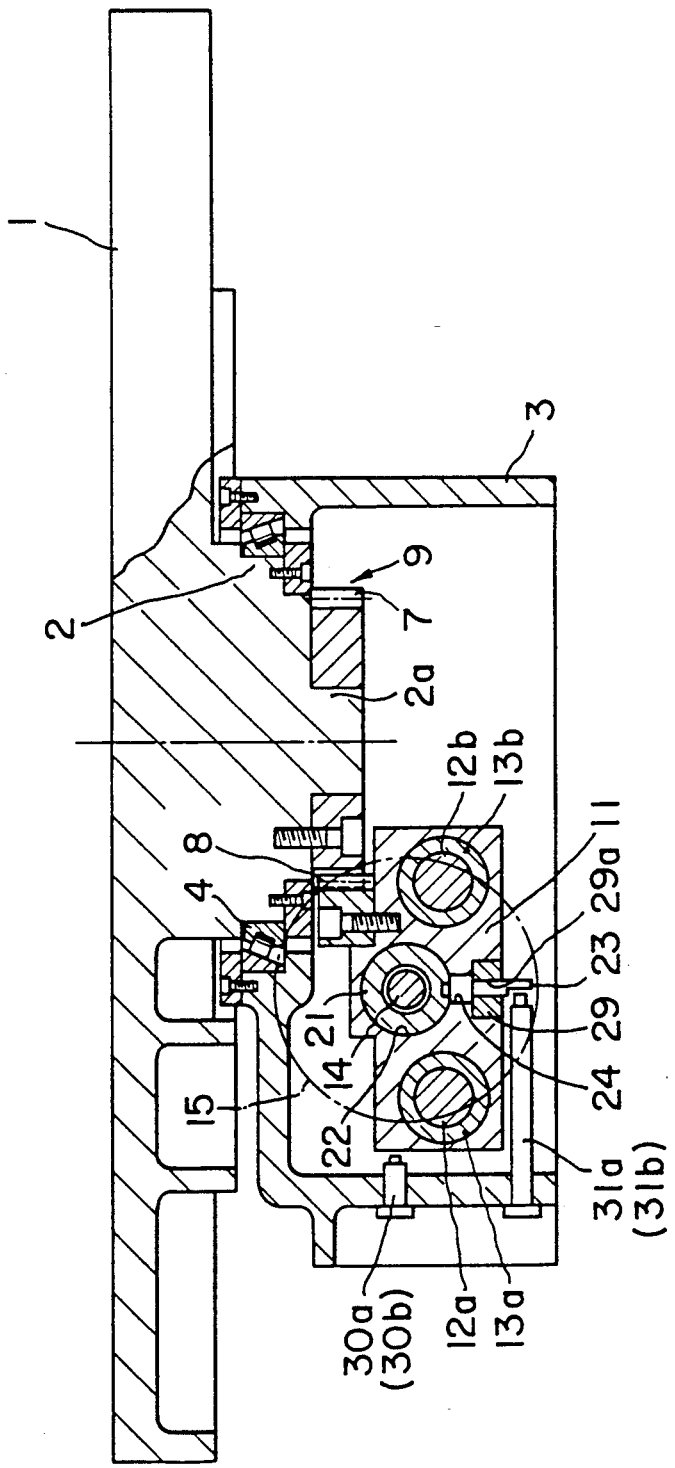
FIG. 2 is a sectional view of a rack-pinion mechanism in association with a slider of the indexing apparatus of FIG. 1.
Figure 3:
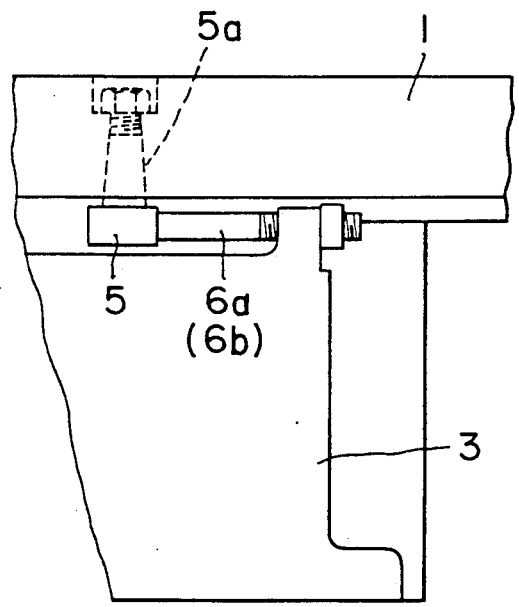
FIG. 3 is a view seen in an arrowed direction III in FIG. 1.

Referring to FIG. 2, a support shaft 2 for supporting a rotary table 1 is provided below the table 1 so as to extend integrally therefrom. The support shaft 2 is supported by a roller bearing 4 arranged in a base 3 so that the rotary table 1 can be turned. As shown in FIG. 3, a stopper member 5 is snugly fitted on the lower end of a tapered shaft portion 5a extending downwards from the lower surface of the rotary table 1. The stopper member 5 is adapted to abut against one of positioning members 6a and 6b (see also FIG. 1) provided on the base 3, at each terminal position of the rotary movement of the rotary table 1.

The support shaft 2 is provided with a lower shaft portion 2a having a smaller diameter than the main portion of the shaft, to which shaft portion 2a a pinion 7 is fixedly secured. This pinion 7 and a rack 8 engaging with the pinion 7 constitute a rack-pinion mechanism 9. The rack 8 is fixedly secured to an upper surface of a slider 11.

As shown in FIG. 1, the base 3 is provided with side walls 3a and 3b between which a pair of guide shafts (ball guide shafts) 12a and 12b extend horizontally in parallel at positions below the pinion 7. In the slider 11 are disposed slide bearings (ball guides) 13a and 13b into which the guide shafts 12a and 12b are inserted, respectively, so as to slidingly guide the slider 11 in an arrowed direction A, i.e. the moving direction of the rack 8, as shown in FIG. 1.

A feed screw shaft (ball screw) 14 extending in the moving direction of the rack 8 is disposed between and along the guide shafts 12a and 12b. One end of the feed screw 14 is coupled with a drive shaft 15a of an electric motor 15 with a braking device (merely called motor 15 hereinafter) through a coupling member 16. The motor 15 is secured to the right wall (as viewed) 3b of the base 3 and rotates with rotational speed variable by an inverter controller 18. The other end of the feed screw 14 is supported by the left wall 3a of the base 3 through a bearing 17.

A feed nut 21 is screw-engaged with an intermediate portion of the feed screw 14, and the feed nut 21 is fitted axially slidably in a slide hole 22 formed in the slider 11. As shown in FIG. 2, a dog 23 is integrally embedded in a lower portion of the feed screw 21 and the dog 23 extends downwardly through an axial slot 24 formed in the lower portion of the slider 11 and through an axial slot 29a formed in a support member 29 secured to the lower surface of the slider 11. The slot 29a is disposed below the slot 24, as viewed in FIG. 2. The engagement of the dog 23 in the slot 24 prevents the rotation of the feed screw 21.

The slide hole 22 has an axial length equal to that of the feed nut 21. Adjacent to the axial ends of the slide hole 22 are formed a pair of spring accommodation spaces or holes 25a and 25b, each having a diameter larger than that of the slide hole 22, thereby forming stepped portions 29a and 29b between the holes 22 and holes 25a, 25b. Annular members 26a and 26b are fitted movably in the spring accommodation holes 25a and 25b, respectively. The end portions of the spring accommodation holes 25a and 25b are closed by stop members 27a and 27b, which are fixedly secured to the slider 11. Spring members 28a and 28b, preferably annular springs, which have substantially identical shapes with each other, are disposed between the annular members 26a and 26b and the stop members 27a and 27b, holes 25a and 25b. According to this construction, the annular members 26a and 26b are urged to abut against the stepped portions 29a and 29b between the hole 22 and the holes 25a, 25b, whereby the feed nut 21 is positioned axially with respect to the slider 11.

The base 3 also has a front wall 3c to which is attached proximity switches 30a and 30b for a timer These proximity switches 30a and 30b detect the position of the slider 11 on the way of the rotary indexing motion of the rotary table 1 during clockwise or counterclockwise rotation thereof, to output timer operation signals for instructing the timer to output a signal to start the speed reduction of the electric motor 15. In this embodiment, the timer proximity switch 30a is utilized for the counterclockwise rotary indexing motion of the turn table 1, and the switch 30b is utilized for the clockwise rotary indexing motion.

Further proximity switches 31a and 31b for motor stopping operation are arranged to the lower portion of the front wall 3c of the base 3. These switches 31a and 31b operate to detect the position of the dog 23 disposed below the feed nut 21 and to output signals representing instructions for stopping the driving of the motor 15 and starting a braking operation. In this embodiment, the proximity switch 31a is utilized for the counterclockwise rotary indexing stopping operation of the rotary table 1 and the proximity switch 31b is utilized for the clockwise rotary indexing stopping operation. The respective proximity switches 31a and 31b are arranged so that, after the stopper member 5 of the rotary table 1 abuts against the positioning member 6a (6b) of the base 3 at one of the terminal positions of the rotation of the rotary table 1 and then the slider 11 is stopped, the switch 31a (31b) faces the dog 23 at a time when the feed screw shaft 14 has been further rotated by a predetermined amount of rotation in the same direction as that in which the shaft 14 had been rotated, thereby to place the feed nut 21 at a position where the annular springs 28a (28b) are flexed or compressed by a predetermined amount.

The indexing operation will be described below, assuming that the rotary table 1 is at the angular position shown in FIG. 1 in which the rotary table 1 is at the counter-clockwisely turned terminal position, and the rotary table 1 is to be turned towards the clockwisely turned terminal position.

At the counter-clockwisely turned terminal position, the feed nut 21 forces the annular spring 28a to the right as shown in FIG. 1, so that the stopper member 5 is urged by the force of the annular spring 28a against the positioning member 6a. In this state, the position of the turn table 1 is maintained due to the actuation of the braking device of the electric motor 15. The braked state is released in response to the generation of an indexing signal, and the feed screw shaft 14 is then rotated to feed the feed nut 21 to the left as viewed, in a gradually accelerated manner by the electric motor 15 under the inverter-controlled condition. When the feed nut 21 moves to the left into the slide hole 22 and then abuts against the annular member 26b, the slider 11 is caused to move to the left through the annular spring 28b now being compressed (point a in the diagram of FIG. 4). In accordance with the leftward movement of the slider 11, the rack 8 turns the pinion 7 and the rotary table 1 is therefore turned and indexed in the clockwise direction.

When the proximity switch 30b detects the slider 11 on the way of the indexing operation (point b in the diagram of FIG. 4), a detection signal is generated and a speed reduction starting time t (FIG. 1) is operated in response to that detection signal. After a preset time T of the timer has elapsed, the electric motor 15 starts the speed reduction operation by the inverter control (point c in the diagram of FIG. 4). The degree of this speed reduction is set such that the speed reaches an inverter-controllable minimum rotational speed at a point (point d in the diagram of FIG. 4) slightly before the time at which the stopper member 5 abuts against the positioning member 6b, and the stopper member 5 abuts against the positioning member 6b (point e in the diagram of FIG. 4) with this minimum speed. Even if a shock is generated at the time of abutting of the stopper member 5 against the positioning member 6b, this shock is elastically absorbed by the spring 28a disposed on the side opposing the advancing direction, and the rotary movement caused by the rack-pinion mechanism 9 as well as the linear movement of the slider 11 is stopped.

At this moment, since the dog 23 of the feed nut 21 is positioned at an axially intermediate position of the slide hole 22, this position of the dog 23 is not detected by the proximity switch 31b. The motor 15 is further operated to rotate the feed screw shaft 14 with a low speed.

Figure 4:
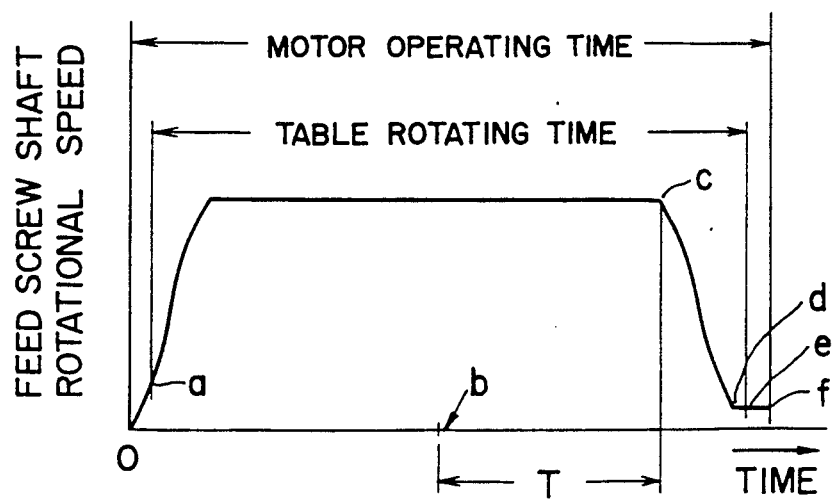
FIG. 4 is a diagram showing variations with time of the rotational speed of a feed screw of the indexing apparatus.

When the feed nut 21 has been moved further to the left in the slide hole 22 while compressing or flexing the annular spring 28b to such a degree that the spring 28b is flexed by a predetermined amount, the proximity switch 31b detects the dog 23 below the feed nut 21, the operation of the electric motor 15 is stopped by the braking operation (point f in the diagram of FIG. 4).

According to the above described manner, the stopper member 5 of the rotary table 1 is now urged and positioned, against the positioning member 6b of the base 3 by the force of the spring 28b, and this state is maintained by the braking force of the motor 15. The rotary indexing operation of the rotary table 1 in the counterclockwise direction by 180 degrees is carried out in substantially the same manner as that described above with respect to the clockwise operation.

In the first embodiment described above, the motor 15 is accelerated and decelerated, respectively, at the indexing starting time and the indexing finishing time by means of the inverter controller 18 and the rotational speed is reduced to a minimum for the inverter-control operation immediately before the indexing finishing time, so that the shock caused by the abutment of the stopper member 5 against the positioning member 6a or 6b is remarkably reduced, whereby a smooth turning of the rotary table for the indexing operation is achieved.

A second embodiment of the indexing apparatus according to this invention will be described hereunder with reference to FIGS. 5 and 6, in which like reference numerals are applied to members or elements corresponding to those shown in FIGS. 1 to 4.

Figure 5:
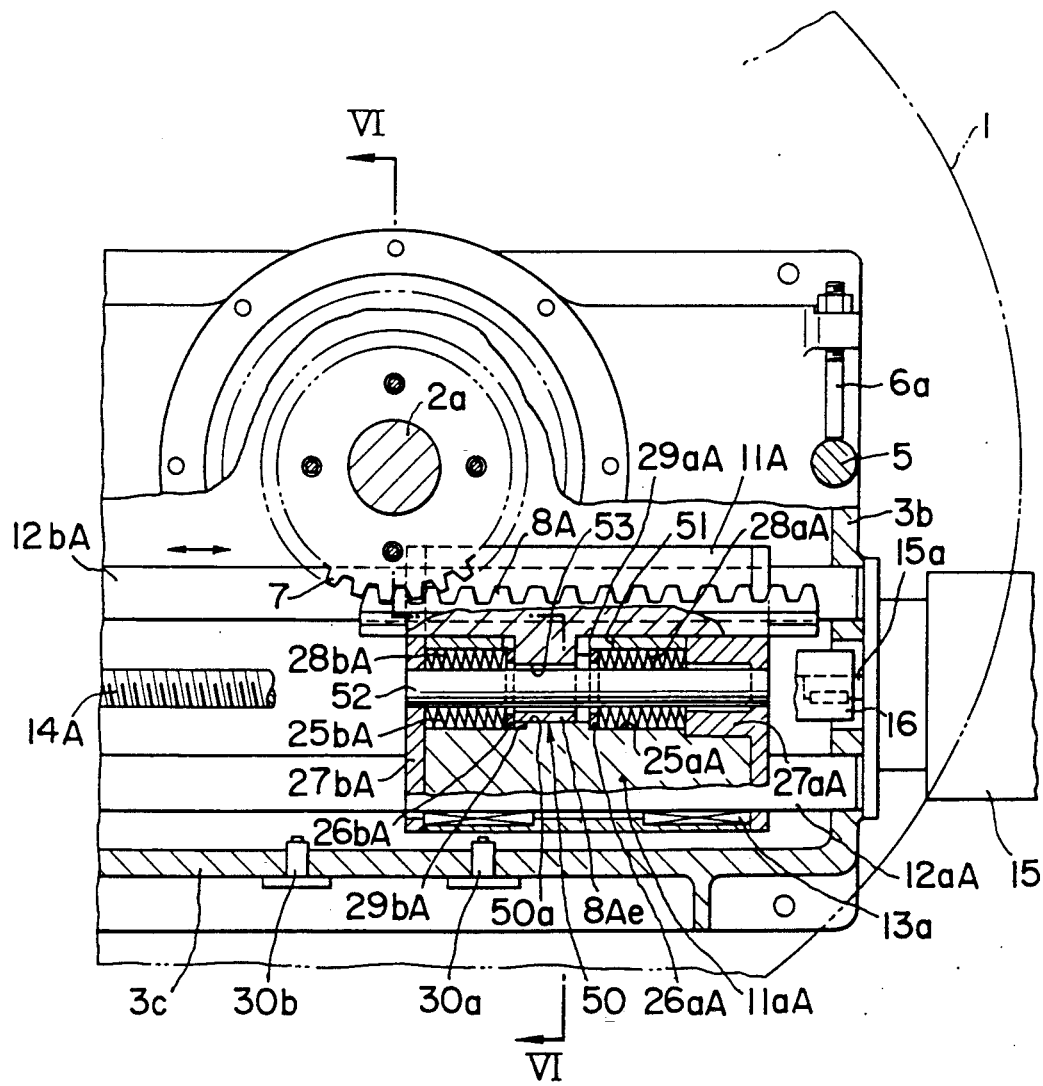
FIG. 5 is a plan view similar to that of FIG. 1, of a second embodiment of the index apparatus according to this invention.
Figure 6:
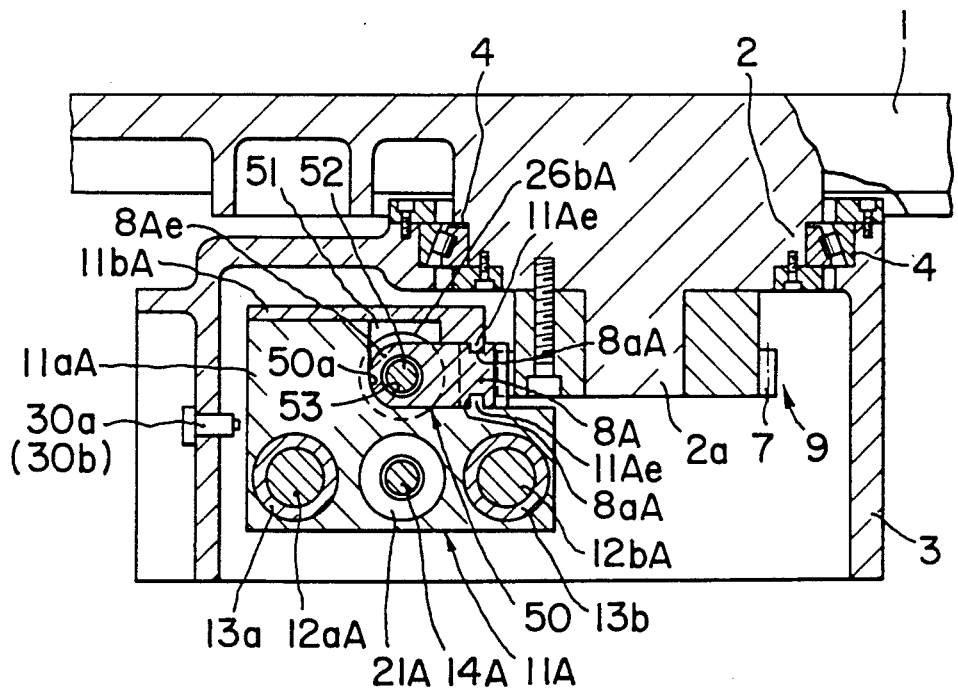
FIG. 6 is a sectional view taken along the line VI—VI of FIG. 5.

Referring to FIGS. 5 and 6, a feed nut 21A screw engaged with a feed screw shaft 14A is formed integrally with a slider 11A slidably mounted on a pair of guide shafts 12aA and 12bA, and a rack 8A is secured to the slider 11A to be slidable relative to the same in a direction of the movement of the rack 8A. The rack 8A is provided with a guide groove 8aA in which is fitted a guide rib 11Ae on the slider 11A. The rack 8A is guided by a guide member 11bA fixedly secured to the slider 11A. The guide member 11bA has a guide rib 11Ae slidably fitted in a guide groove 8aA. The rack 8A is further provided with an operating portion 8Ae projecting from the body of the rack 8A so as to fit in an intermediate portion of an accommodation hole 50 formed in the slider 11A in parallel with the moving direction of the rack 8A. The accommodation hole 50 is composed of a central operation hole 50a and spring accommodation holes 25aA and 25bA disposed at both sides of the central operation hole 50a. The operation hole 50a has a diameter smaller than that of each of the holes 25aA and 25bA. The axial length of the operation hole 50a is made substantially the same as the thickness of the operating portion 8Ae. The slider 11A has a slider body 11aA provided with a cutout opening 51, and the operating portion 8Ae is inserted into the operation hole 50a through the cutout opening 51 to be movable in the moving direction of the rack 8A. The outer ends of the spring accommodation holes 25aA and 25bA are closed by stopper members 27aA and 27bA secured to the slider body 11aA. A support rod 52 secured to the stopper members 27aA and 27bA is inserted into the accommodation hole 50. The support rod 52 extends through a hole formed in the operating portion 8Ae. Annular members 26aA and 26bA and annular springs 28aA and 28bA are accommodated in the respective holes 25aA and 25bA between the operating portion 8Ae and the stopper members 27aA and 27bA so that the springs 28aA and 28bA urge the annular members 26aA and 26bA against stepped portions 29aA and 29bA formed by the difference in diameters between the operation hole 50a and the spring accommodation holes 25aA and 25bA, thus positioning the operating portion 8Ae in the slider 11A.

According to the structure described above, when the slider 11A is moved to the right as viewed in FIG. 5 in accordance with the movement of the feed nut 21A, the stopper member 5 of the rotary table 1 abuts against the positioning member 6a and the turning of the rotary table 1 stops, and hence, the rightward movement of the rack 8A is stopped. As the slider body 11aA is moved to the right by the further movement of the feed nut 21A, the lefthand stopper member 27bA compresses the spring 28bA and the annular member 26bA forces the operating portion 8Ae to the right. In a subsequent operation, as described with respect to the first embodiment, the motor 15 stops and the braking operation is effected to maintain the condition thus obtained. As a result, the stopper member 5 is maintained in a state urged by the force of the spring 28bA against the positioning member 6a. Thus, substantially the same function as those described hereinbefore with respect to the first embodiment is obtained. In the case in which the slider 11A is moved to the left, the operation is the same as above.

What is claimed is:

1. An indexing apparatus for a rotary table having a support shaft rotatably supported by a base, in which terminal positions of rotary indexing of the rotary table is determined by abutment of a stopper member provided on the rotary table against respective positioning means provided on the base, the indexing apparatus comprising:
   a rack-pinion mechanism including a rack and a pinion meshing with the rack and mounted around the support shaft of the rotary table for rotating the rotary table by shifting movement of the rack;
   a feed screw shaft supported in the base to be rotatable, said feed screw shaft extending in parallel with the rack in the direction of the shifting movement thereof;
   an electric motor equipped with braking means and a drive shaft operatively connected to said feed screw shaft so as to drive the same;
   a feed nut mounted on said feed screw shaft in screw-engaged manner, said rack and said feed nut being arranged so that either one of the rack and the feed nut has integral means disposed at both sides of the other with spaces left on the both sides in a direction parallel to the direction of the shifting movement of the rack; and
   spring means disposed within said respective spaces, said spring means being elastically deformable in said direction parallel to the direction of the shifting movement of the rack upon relative movement of the feed nut and the rack.

2. An indexing apparatus according to claim 1, further comprising a slider mounted to said base to be movable in the direction of the movement of said rack, said rack being fixedly mounted to said slider, said slider being provided with an inner slide hole into which said feed nut is disposed to be slidable in the direction of the movement of said rack, said slider being provided with a pair of stopper members on both sides of said feed nut with spaces left in the direction of the movement of said rack, said spring means being disposed between said feed nut and said stopper members, respectively.

3. An indexing apparatus according to claim 2, wherein said slide hole has an axial length in the direction of the movement of said rack, substantially equal to an axial width of said feed nut in the direction of the movement of the rack and wherein said slider is provided with accommodation holes on both axial sides of said slide hole, each of said accommodation holes having a diameter larger than that of the slide hole so as to form stepped portions therebetween, annular members are disposed in abutment against said stepped portions, and said spring means are disposed between said stopper members of the slider and said annular members.

4. An indexing apparatus according to claim 2, wherein said base is provided with side walls between which a pair of guide shafts extend in parallel below the pinion, and said screw shaft is disposed in parallel to and between said guide shafts so as to guide said slider in the direction of the movement of said rack.

5. An indexing apparatus according to claim 2, wherein said base is provided with another wall extending between said sidewalls and wherein proximity switch means are arranged on the other wall of the base to detect positions of said slider and to output a signal for reducing the speed of the electric motor during the rotary indexing of the rotary table and other proximity switch means are also arranged on the other wall of the base to detect positions of the feed nut and to output a signal for stopping and braking the electric motor 6. An indexing apparatus according to claim 1, further comprising a slider mounted to said base to be movable in the direction of the movement of said rack, said rack being slidably mounted to said slider, said slider being provided with stopper members at both axial end portions thereof, said rack being provided with an operating portion so as to extend therefrom into a space defined between said stopper members, said spring means being disposed between said stopper members and said operating portion of the rack, respectively.

7. An indexing apparatus according to claim 6, wherein the space between the stopper members is formed as an accommodation hole means composed of a central operation hole and spring accommodation holes disposed axially on both sides of the operation hole, which has a diameter smaller than that of the accommodation holes to form stepped portions therebetween.

8. An indexing apparatus according to claim 7, wherein said operating portion has a size capable of being inserted into said operation hole and said operation hole has an axial length substantially equal to an axial thickness of said operating portion.

9. An indexing apparatus according to claim 7, wherein annular members are disposed in said accommodation holes so as to abut against the stepped portion by urging forces of the spring means disposed in said accommodation holes, respectively, thereby to position the operating portion in the slider.

10. An indexing apparatus according to claim 1, wherein said spring means are a number of mutually stacked annular springs.

11. An indexing apparatus according to claim 1, further comprising an inverter controlling means operatively connected to said electric motor to control rotary speed of the drive shaft of said electric motor.

* * * * *